(12) United States Patent
Nagahashi (10) Patent No.: US 9,441,959 B2
(45) Date of Patent: Sep. 13, 2016

(54) CALIBRATION METHOD AND SHAPE MEASURING APPARATUS

(71) Applicant: SEIKO EPSON CORPORATION, Tokyo (JP)

(72) Inventor: Toshinori Nagahashi, Tatsuno-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 143 days.

(21) Appl. No.: 14/543,700

(22) Filed: Nov. 17, 2014

(65) Prior Publication Data

US 2015/0138565 A1 May 21, 2015

(30) Foreign Application Priority Data

Nov. 18, 2013 (JP) ................................. 2013-238114

(51) Int. Cl.
*G01B 11/24* (2006.01)
*G01B 11/25* (2006.01)

(52) U.S. Cl.
CPC ......... *G01B 11/2504* (2013.01); *G01B 11/254* (2013.01)

(58) Field of Classification Search
CPC . G01B 11/2536; G01B 11/245; G01B 11/25; G01B 11/02; G06T 7/0057
USPC ........................................................ 356/610
See application file for complete search history.

(56) References Cited

U.S. PATENT DOCUMENTS

| 6,421,629 | B1 * | 7/2002 | Ishiyama | G01B 11/255 |
| | | | | 702/159 |
| 7,852,489 | B2 * | 12/2010 | Sugiyama | G01B 11/2441 |
| | | | | 356/511 |
| 8,224,070 | B2 * | 7/2012 | Umemura | G01B 11/0608 |
| | | | | 382/144 |
| 2013/0128282 | A1 * | 5/2013 | Ishigaki | G01B 11/245 |
| | | | | 356/610 |

FOREIGN PATENT DOCUMENTS

JP         2010-203867 A      9/2010

* cited by examiner

*Primary Examiner* — Tarifur Chowdhury
*Assistant Examiner* — MD M Rahman
(74) *Attorney, Agent, or Firm* — Maschoff Brennan (57) ABSTRACT

A calibration method includes acquiring a captured image of a lattice fringe by providing a reference gauge having a reference surface whose height from a reference plane changes in a first direction, projecting a fringe pattern having the same phase along the first direction with respect to the reference surface and having a phase changing in a second direction crossing the first direction, and imaging the fringe pattern; calculating a phase of each pixel along the first direction in the captured image of the fringe pattern; and generating relational data in which the height of the reference surface corresponding to the pixel, the phase calculated with respect to the pixel, and a period of the fringe pattern at the time of calculating the phase are associated with each other.

5 Claims, 10 Drawing Sheets

CALIBRATION METHOD AND SHAPE MEASURING APPARATUS

BACKGROUND

1. Technical Field

The present invention relates to a calibration method in a shape measuring apparatus that measures a three-dimensional shape of a measurement object, and the shape measuring apparatus.

2. Related Art

Hitherto, a phase shift method has been known as a method of acquiring a three-dimensional measured value of a measurement object using a three-dimensional measuring apparatus (for example, see JP-A-2010-203867).

In the apparatus disclosed in JP-A-2010-203867, a plurality of lattice fringes having different phases are projected onto a measurement object from a projecting unit, and images of the lattice fringes are captured by an imaging unit. A three-dimensional shape of the measurement object is measured from the obtained images of the lattice fringes, using a phase shift method.

Here, in this apparatus, calibration is performed prior to an actual three-dimensional measurement. In this calibration, first, a flat plate is installed on a precision stage, and the stage is moved by a distance $\Delta z$ in a z direction so as to shift the phases of the lattice fringes.

Using a coarse lattice fringe, a fine lattice fringe, and a minute lattice fringe, which have different periods, in order to calculate a z-coordinate with high accuracy, candidates for a z-coordinate of each pixel in a captured image of each of the lattice fringes are calculated using an approximate expression.

A combination where a difference between the z-coordinate candidate of the fine lattice fringe and the z-coordinate candidate of the minute lattice fringe is minimized is extracted, and the z-coordinate of the minute lattice fringe of the extracted combination is set to be a calculation value.

Incidentally, in the above-described measuring apparatus disclosed in JP-A-2010-203867, the phase of an interference fringe is shifted by moving the stage by $\Delta z$ in the z direction. In this case, a complex configuration for precisely moving the stage is required, and thus the time spent on calibration is lengthened. At this time, there is also a restriction such as the need to set $\Delta z$ to a value having a phase change equal to or less than $2\pi$.

Further, using lattice fringes (fine lattice fringe and minute lattice fringe) having different periods in order to calculate the z-coordinate more accurately, a phase of each pixel is calculated with respect to the captured images of the lattice fringes, and a z-coordinate corresponding to the pixel is estimated from the phase. However, there is a need to provide a phase difference of equal to or greater than $2\pi$ in both the fine lattice fringe and the minute lattice fringe with respect to a measurement range (stage movable amount) in the z direction, and thus there is also a problem in that a period to be set is restricted.

SUMMARY

An advantage of some aspects of the invention is to provide a calibration method and a shape measuring apparatus which are capable of performing calibration with a simple configuration in a short period of time.

A calibration method according to an aspect of the invention includes acquiring a captured image of a lattice fringe by providing a reference gauge having a reference surface whose height from a reference plane is known and changes along a first direction, projecting lattice fringes having the same phase in the first direction with respect to the reference surface and having phases sinusoidally changing in a second direction crossing the first direction, changing periods of sine waves multiple times and shifting the phases of the lattice fringes with respect to the periods multiple times, and acquiring captured images obtained by imaging the respective lattice fringes; calculating phases of the respective pixels along the first direction in the captured images of the plurality of lattice fringes having different phases, the captured images being acquired with respect to the lattice fringes having the respective periods; and generating relational data in which a height of the reference surface corresponding to each pixel, a phase calculated with respect to the pixel, and a period of the lattice fringe when the phase is calculated are associated with each other.

Here, a change in the height of the reference surface along the first direction includes, for example, a configuration in which the reference surface has a step shape along the first direction and a plurality of surfaces parallel to the reference plane and having different heights are provided, and a configuration in which the reference surface is inclined to the reference plane along the first direction.

In the aspect of the invention, lattice fringes having the same phase in the first direction, in other words, in a height changing direction are projected onto the reference surface, and the phases of the lattice fringes are shifted multiple times, thereby acquiring the captured image. Images of the plurality of lattice fringe patterns having a shifted phase are captured with respect to the lattice fringes having the respective periods, and thus each of phases of pixels corresponding to a location along the first direction is calculated from the captured images of the lattice fringes having different phases. In general, when the heights are the same, the phases of the pixels are the same. However, the phases also change in relation with the change in the height. Since the phase has a proportional relationship with the height, the amount of change in the height of the reference gauge having a known height is compared with the amount of change in the phase, and thus it is possible to associate the height with the phase.

As described above, in the aspect of the invention, since a driving mechanism for accurately moving a precision stage and the like may not be required as in the related art, it is possible to achieve a simple configuration. In addition, since there is no need to move the stage, it is possible to perform a calibration process at high speed.

In the calibration method according to the aspect of the invention, it is preferable that the reference surface includes a reference point having a known height from the reference plane, and the calculating of a phase includes acquiring a phase of the reference point.

In the configuration described above, a reference point having a known height is provided in the reference gauge. Therefore, a phase for the location of the reference point is acquired, and thus it is possible to easily associate the height with the phase.

In the calibration method according to the aspect of the invention, it is preferable that the calculating of a phase includes compensating for an integral multiple of $2\pi$ with respect to the acquired phase in a case where the phase obtained when the height of the reference surface monotonically increases or monotonically decreases is inverted according to a monotonic increase or a monotonic decrease.

When lattice fringes having the same phase in a height changing direction are projected onto the reference surface whose height monotonically increases in the first direction, the phase generally increases proportionally. However, since the phase changes between 0 and $2\pi$, the calculated phase returns to 0 again. In this case, $2\pi$ is compensated for in the calculating of a phase, and thus it is possible to perform correction so that the phase monotonically changes when the height monotonically increases, and to associate the phase with an accurate height.

A shape measuring apparatus according to another aspect of the invention includes a data storage unit which stores relational data generated by the calibration method described above; a phase acquisition unit which acquires a phase of a measurement point obtained from lattice fringes having different phases; a candidate acquisition unit which acquires height candidates with respect to the respective periods, on the basis of the relational data and the phase acquired by the phase acquisition unit with respect to the lattice fringes whose periods are different from each other; and a height determination unit which obtains an actual height of the measurement point by extracting a combination having a difference minimized between the height candidates, among combinations each including two height candidates acquired with respect to the different periods.

In the aspect of the invention, phases for a plurality of periods are acquired by the phase acquisition unit from lattice fringes having a plurality of periods and phases shifted multiple times. The candidate acquisition unit acquires height candidates for the phases having the respective periods from the relational data. The height determination unit extracts a combination of two height candidates having a difference minimized between the height candidates, and determines one of the height candidates to be an actual height.

In the configuration described above, it is possible to easily measure the height of a measurement object without performing a troublesome process. In addition, for example, there is no need to move the stage at the time of acquiring the relational data, and thus a complex configuration may not be required.

In the shape measuring apparatus according to the aspect of the invention, it is preferable that the shape measuring apparatus further includes a pattern projection unit that projects the lattice fringe onto a measurement object and is capable of changing a phase and a period of the projected lattice fringe; and an imaging unit which captures an image of the projected lattice fringe, and the phase acquisition unit calculates the phase on the basis of the brightness of a pixel corresponding to the measurement point of the image captured by the imaging unit.

In the configuration described above, the lattice fringe is projected by the pattern projection unit, and is then imaged by the imaging unit. In such a configuration, the pattern projected by the pattern projection unit is changed, and thus it is possible to easily acquire the lattice fringe having a changed period and phase. In addition, it is possible to easily change the direction (first direction and second direction) of the lattice fringe and to generate an optimal lattice fringe in accordance with a reference gauge and a measurement object.

In the shape measuring apparatus according to the aspect of the invention, it is preferable that the height determination unit sets a height candidate, which is acquired with respect to the lattice fringe having a short period, as an actual height of the measurement point in the extracted combination of the height candidates.

In the configuration described above, as the period of the lattice fringe becomes shorter, the measurement accuracy thereof increases. Therefore, the height corresponding to a height candidate having a shorter period, in a combination of the extracted pair of candidates, is acquired, and thus it is possible to improve measurement accuracy in the shape measurement.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment according to the invention will be described with reference to the accompanying drawings.

Figure 1:
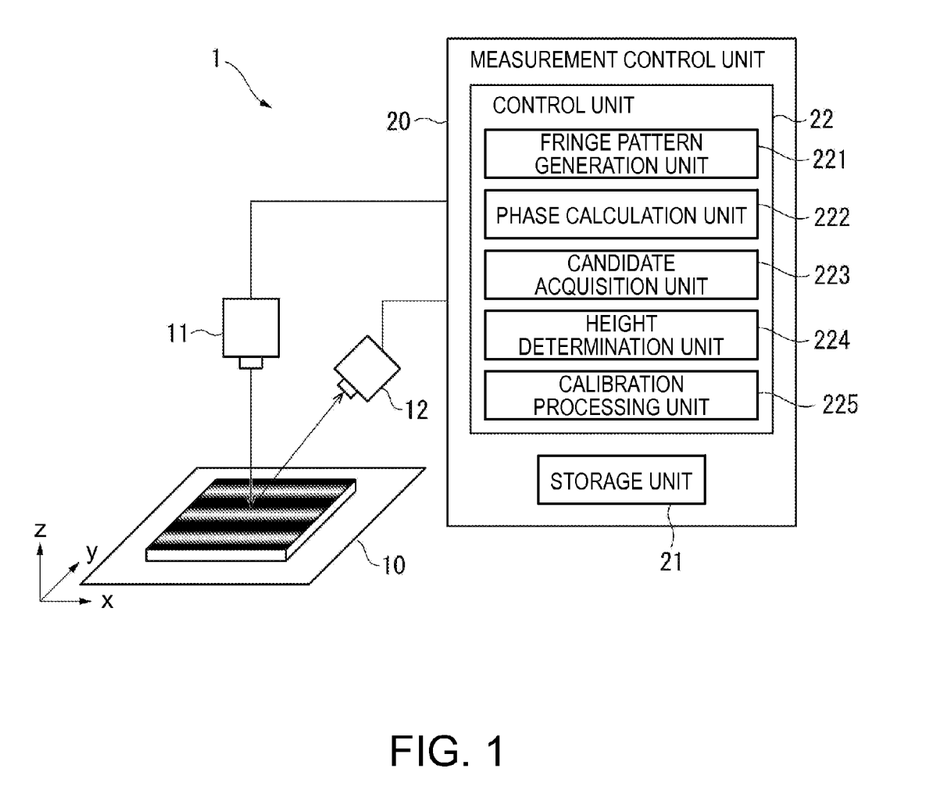
FIG. 1 is a block diagram showing a schematic configuration of a shape measuring apparatus according to an embodiment of the invention.

FIG. 1 is a block diagram showing a schematic configuration of a shape measuring apparatus according to this embodiment.

As shown in FIG. 1, a shape measuring apparatus 1 according to this embodiment includes a stage 10 on which a measurement object can be mounted, a pattern projection unit 11 that performs irradiation with a lattice fringe (fringe pattern), an imaging unit 12 that captures an image of measurement object, and a measurement control unit 20.

In the shape measuring apparatus 1, a measurement object mounted on the stage 10 is irradiated with a fringe pattern from the pattern projection unit 11, and the fringe pattern on the measurement object is imaged by the imaging unit 12. The measurement control unit 20 measures the shape of the measurement object using a phase shift method, on the basis of the captured image of the fringe pattern. Hereinafter, the components will be specifically described.

The pattern projection unit 11, which is a pattern irradiation unit according to the invention, is constituted by, for example, a projector. The pattern projection unit 11 projects a fringe pattern onto the measurement object on the stage 10 under the control of the measurement control unit 20.

Here, as shown in FIG. 1, the fringe pattern projected from the pattern projection unit 11 is a pattern in which phases are the same along a first direction (for example, a direction parallel to an x-axis direction in FIG. 1) and a sinusoidal phase changes in a second direction (for example, a direction parallel to a y-axis direction in FIG. 1) which crosses the x-axis direction.

In addition, it is preferable that the pattern projection unit 11 irradiate the stage 10 with the fringe pattern from a z-axis direction (height direction). In this manner, it is possible to suppress the generation of a shadow of a projection beam due to, for example, irregularities in a measurement object by projecting the fringe pattern from the z-axis direction. In addition, a configuration may be adopted in which the position of the pattern projection unit 11 and a projection direction can be changed. In this case, it is possible to appropriately change a projection direction depending on measurement objects and to appropriately project a fringe pattern onto a surface on which measurement has been performed.

In addition, the pattern projection unit 11 can change a direction (first direction and second direction) of a fringe pattern to be projected, under the control of the measurement control unit 20.

The imaging unit 12, which is a unit that performs imaging according to the invention, is constituted by an imaging device such as, for example, a CCD or a CMOS. The imaging unit 12 images a measurement object from a direction different from a pattern projection direction based on the pattern projection unit 11. Specifically, as shown in FIG. 1, when the fringe pattern having an x-axis direction as a first direction is projected from the z-axis direction, it is preferable that the measurement object be imaged from an imaging direction inclined to an xz plane. Thus, when the measurement object has an inclined plane in which the z-coordinate continuously changes along the x direction, it is possible to image a phase change in the fringe pattern.

Figure 2:
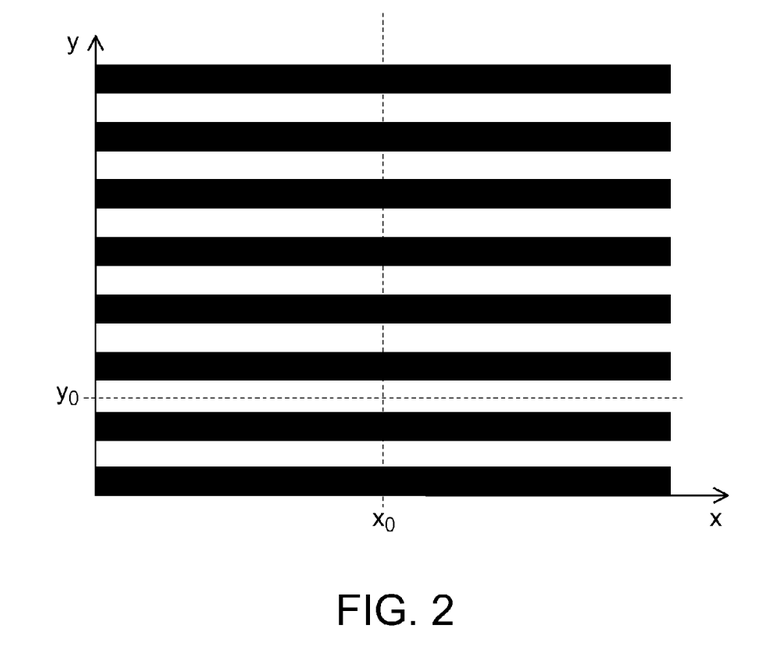
FIG. 2 is a diagram showing a captured image of a fringe pattern projected onto a measurement object surface which is parallel to an xy plane.

FIG. 2 is a diagram showing a captured image of a fringe pattern which is projected onto a measurement object surface parallel to an xy plane. FIG. 2 shows a captured image obtained by imaging a fringe pattern in which a first direction is an x-axis direction and a second direction is a y-axis direction.

Figure 3:
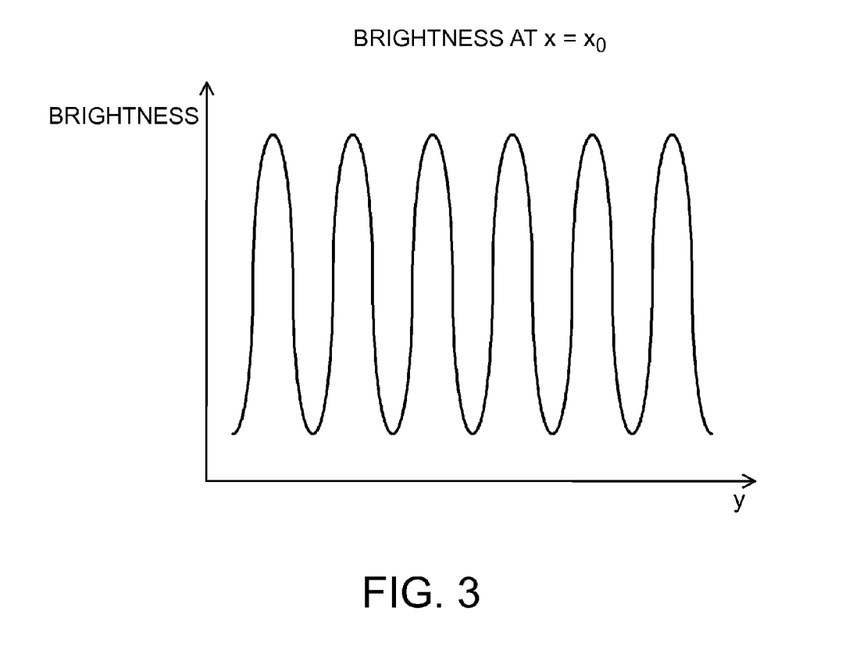
FIG. 3 is a diagram showing changes in brightness along a line direction (parallel to a y-axis) in which the relationship of $x=x_0$ is satisfied, in FIG. 2.
Figure 4:
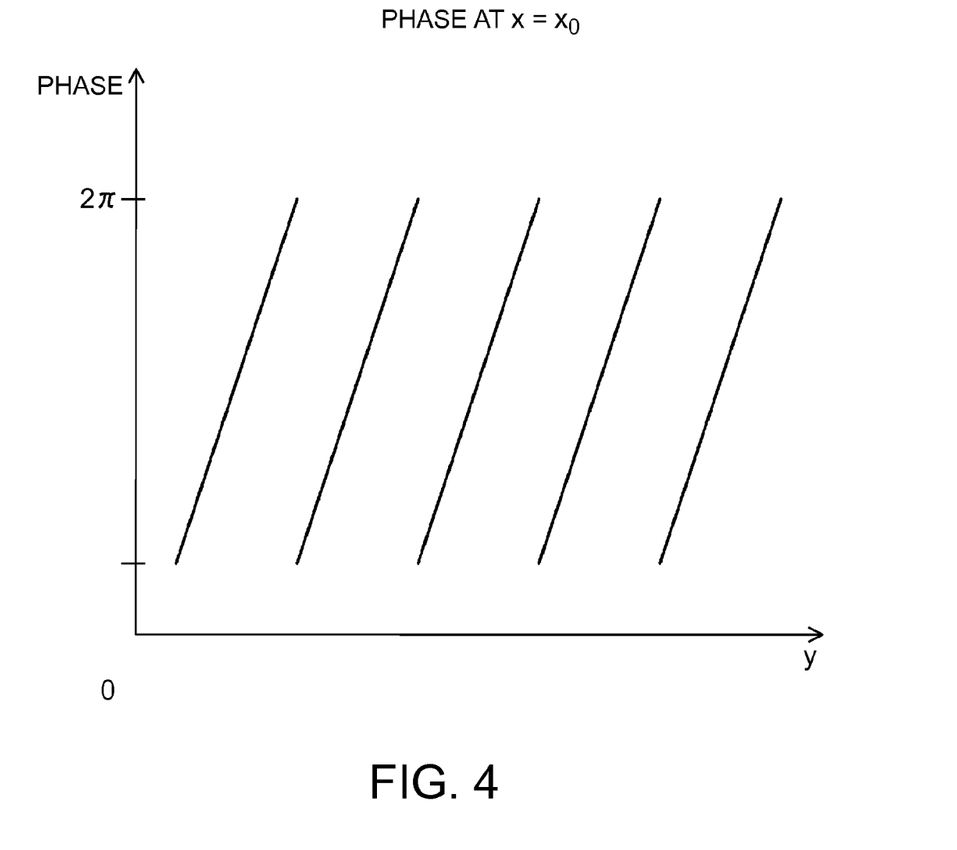
FIG. 4 is a diagram showing a phase change at $x=x_0$ in FIG. 2.
Figure 5:
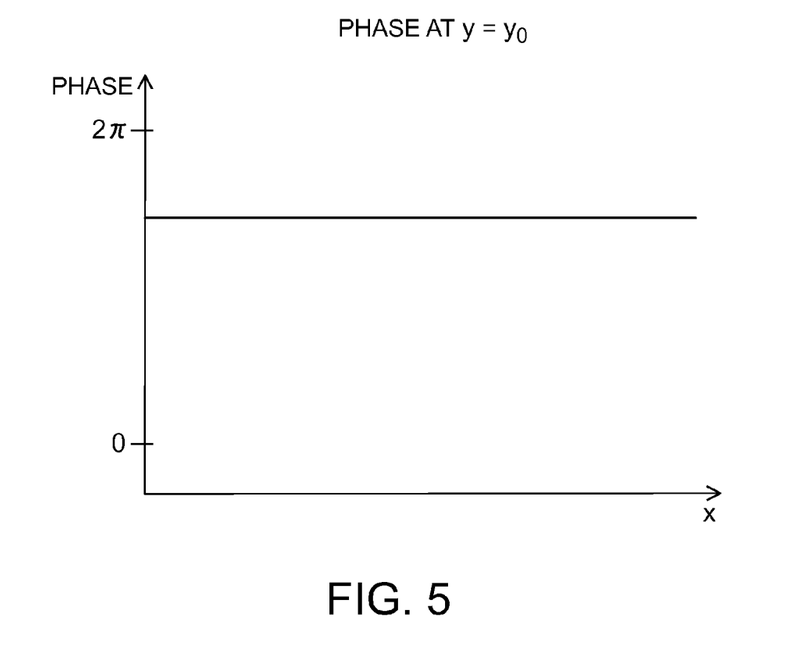
FIG. 5 is a diagram showing a phase change along a line direction (parallel to an x-axis) in which the relationship of $y=y_0$ is satisfied, in FIG. 2.

FIG. 3 is a diagram showing changes in brightness along a line direction (parallel to a y-axis) in which the relationship of $x=x_0$ is satisfied, in FIG. 2. FIG. 4 is a diagram showing a phase change at $x=x_0$. FIG. 5 is a diagram showing a phase change along a line direction (parallel to an x-axis) in which the relationship of $y=y_0$ is satisfied.

As shown in FIGS. 3 and 4, when the above-described fringe pattern is imaged, a captured image is obtained in which the same brightness and phase are set along an x-axis direction which is a first direction and in which a phase and brightness sinusoidally change along a y-axis direction which is a second direction.

The measurement control unit 20 is constituted by a computer, and includes a storage unit 21 and a control unit 22 as shown in FIG. 1.

The storage unit 21, which is a data storage unit according to the invention, is constituted by, for example, a hard disk or a memory and stores various types of programs and various types of data.

For example, relational data indicating a relationship between a z-coordinate value and a phase is stored as the various types of data stored in the storage unit 21.

Figure 6:
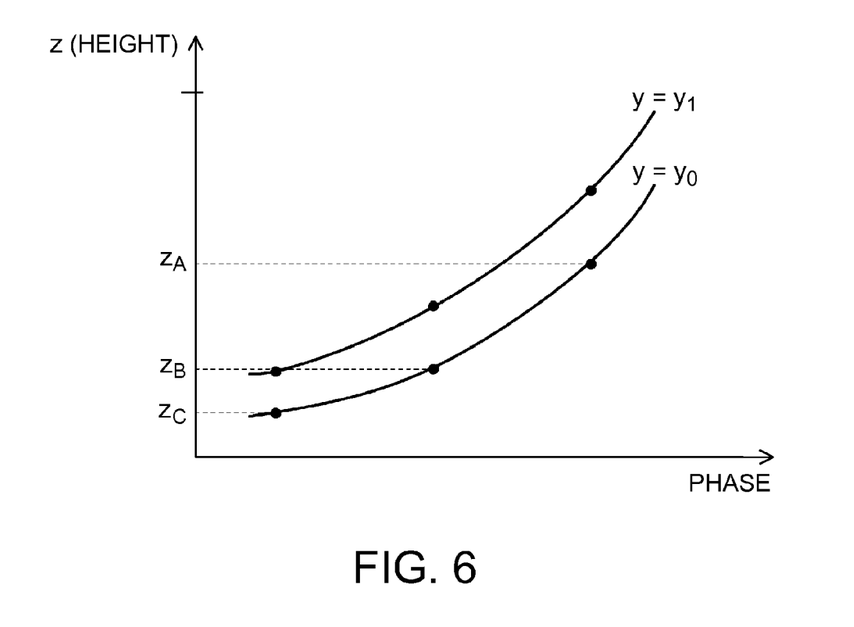
FIG. 6 is a diagram showing an example of relational data according to this embodiment.

FIG. 6 is a diagram showing an example of the relational data stored in the storage unit 21.

FIG. 6 is relational data showing a relationship between a phase and a height (z-coordinate value) at the time of performing irradiation with a fringe pattern in which a first direction is a y-axis direction.

The relational data shown in FIG. 6 is relational data when projecting a fringe pattern in which a first direction is an x-axis direction. In this case, since a phase changes depending on a y-coordinate value, relational data for each y-coordinate value is stored as shown in FIG. 2.

In addition, pieces of relational data for a plurality of fringe patterns having different periods (periods of sine waves shown in a second direction) are stored in the storage unit 21.

Meanwhile, FIG. 2 shows an example of a case where a first direction of a fringe pattern is an x-axis direction. Further, pieces of relational data for a plurality of fringe patterns having a changed first direction of the fringe pattern may be recorded in a similar manner. For example, relational data for a fringe pattern having a first direction as a y-axis direction may be recorded.

The control unit 22 is constituted by a control circuit such as, for example, a central processing unit (CPU). The control unit 22 performs a process by developing various types of programs read out from the storage unit 21 on an OS which controls the overall operation of the shape measuring apparatus 1, and thus functions as a fringe pattern generation unit 221, a phase calculation unit 222 (phase acquisition unit), a candidate acquisition unit 223, a height determination unit 224, and a calibration processing unit 225 as shown in FIG. 1.

The fringe pattern generation unit 221 generates image data for a fringe pattern with which the irradiation is performed from the pattern projection unit 11, and outputs the image data to the pattern projection unit 11. Thus, the fringe pattern generated from the pattern projection unit 11 is projected onto a measurement object.

The phase calculation unit 222, which is a phase acquisition unit according to the invention, calculates a phase of the projected fringe pattern on the basis of the brightness values of the pixels of an image captured by the imaging unit 12. In more detail, when a fringe pattern having a phase shifted multiple times (for example, twice) is imaged, the brightness values of the pixels (x, y) in each captured image can be expressed as follows.

$$I_0(x,y)=I_b+I_{AMP}(x,y)\cos(\phi(x,y))$$

$$I_1(x,y)=I_b+I_{AMP}(x,y)\cos(\phi(x,y)+\Delta\theta_1)$$

$$I_2(x,y)=I_b+I_{AMP}(x,y)\cos(\phi(x,y)+\Delta\theta_2) \quad (1)$$

In Expression (1) mentioned above, $\psi(x, y)$ denotes a phase, and $\Delta\theta_1$ and $\Delta\theta_2$ denote the amount of phase shift. In addition, $I_b$ denotes a bias component, and $I_{AMP}(x, y)$ denotes a change in brightness depending on a fringe pattern and indicates the strength of sine wave contrast. As shown in Expression (1), irradiation with a fringe pattern is performed from the pattern projection unit 11 in three phases which are an initial phase $\psi(x, y)$, a first phase $\psi(x, y)+\Delta\theta_1$, and a second phase $\psi(x, y)+\Delta\theta_2$. Then, the brightness values of pixels (x, y) of the captured images of the respective fringe patterns are detected.

Here, when the relationships of $\Delta\theta_1=2\pi/3$ and $\Delta\theta_2=4\pi/3$ are established, the phase $\psi(x, y)$ can be obtained by the following Expression (2).

Meanwhile, in this embodiment, shape measurement and calibration are performed using a fringe pattern having a plurality of periods. Therefore, the phase calculation unit 222 calculates the above-described initial phase $\psi(x, y)$ with respect to the periods of the fringe pattern.

$$\varphi(x, y) = \tan^{-1}\left(\sqrt{3}\ \frac{I_1(x, y) - I_2(x, y)}{I_1(x, y) + I_2(x, y) - 2I_0(x, y)}\right) + 2k\pi \quad (2)$$

(herein, k is an integer)

The candidate acquisition unit 223 obtains candidates (height candidates) of a z-coordinate value for the calculated phase $\psi(x, y)$, on the basis of the calculated phase $\psi(x, y)$ and the relational data stored in the storage unit 21.

As described above, in this embodiment, shape measurement and calibration are performed using fringe patterns having a plurality of periods. The candidate acquisition unit 223 acquires height candidates with respect to each of the fringe patterns having a plurality of periods.

The height determination unit 224 calculates a difference value between the height candidates obtained by the candidate acquisition unit 223 and extracts two height candidates having the difference value minimized therebetween. Among the height candidates, a height candidate corresponding to the fringe pattern having a shorter period is determined to be an actual height.

The calibration processing unit 225 performs a calibration process of acquiring the above-described relational data, using a reference gauge having a known shape.

Operation Processing of Shape Measuring Apparatus Calibration Method

Figure 7:
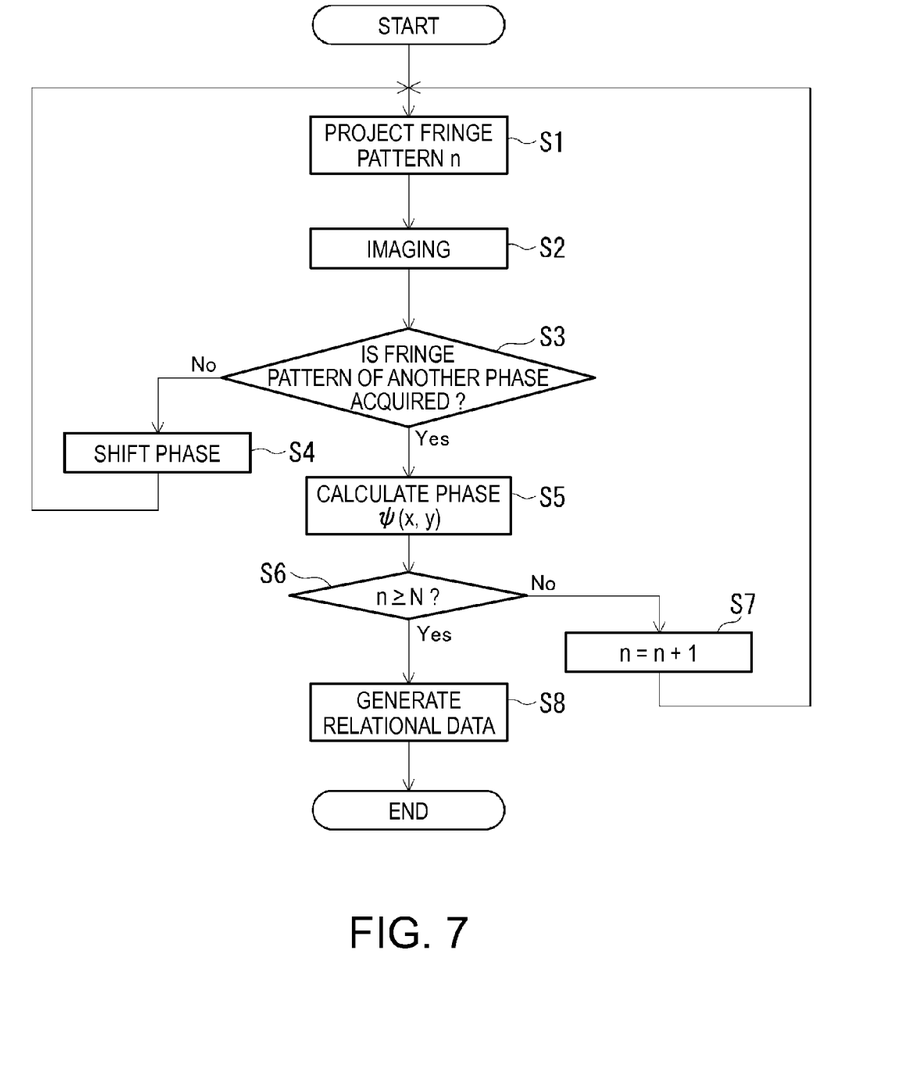
FIG. 7 is a flow chart showing a calibration method according to this embodiment.

FIG. 7 is a flow chart of a calibration method (calibration process) using the shape measuring apparatus according to this embodiment.

Figure 8:
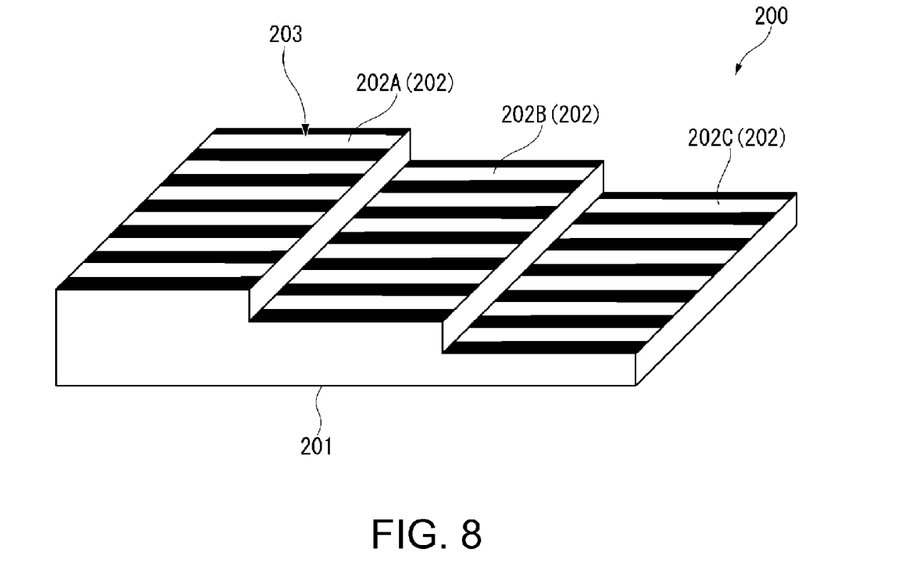
FIG. 8 is a schematic perspective view showing a reference gauge which is used in a calibration process according to this embodiment.

FIG. 8 is a diagram showing an example of a reference gauge used in calibration.

As shown in FIG. 8, a reference gauge 200 has a bottom surface 201 (reference plane) mounted on the stage 10, and a reference surface 203 including a plurality of stepped surfaces 202 (202A, 202B, and 202C) having a known height (size in a z-axis direction) from the bottom surface 201. Here, a height of the stepped surface 202A is set to $z_A$, a height of the stepped surface 202B is set to $z_B$, and a height of the stepped surface 202C is set to $z_C$. That is, the stepped surfaces 202 serve as reference points having a known height from the bottom surface 201 which is a reference plane.

In this embodiment, an example in which three stepped surfaces 202 are provided is shown. However, a configuration may be adopted in which a greater number of stepped surfaces are provided depending on a z-coordinate range to be measured, measurement accuracy, and the like, or a configuration may be adopted in which a difference between the heights of the stepped surfaces 202 is set more precisely.

In the calibration process, first, the above-described reference gauge 200 is mounted on the stage 10. Here, it is assumed that a height changing direction (stepped direction) in which the height of the reference surface 203 of the reference gauge 200 changes is an x-axis direction.

The fringe pattern generation unit 221 generates a fringe pattern n (n is a configuration variable, and an initial value thereof is set to 1) in which a first direction is set to the height changing direction of the reference surface 203, and projects the generated fringe pattern n onto the reference surface 203 of the reference gauge 200 from the pattern projection unit 11 (step S1).

Then, the fringe pattern n projected onto the reference surface 203 of the reference gauge 200 is imaged by the imaging unit 12 (step S2). The captured image is appropriately stored in the storage unit 21.

Figure 9:
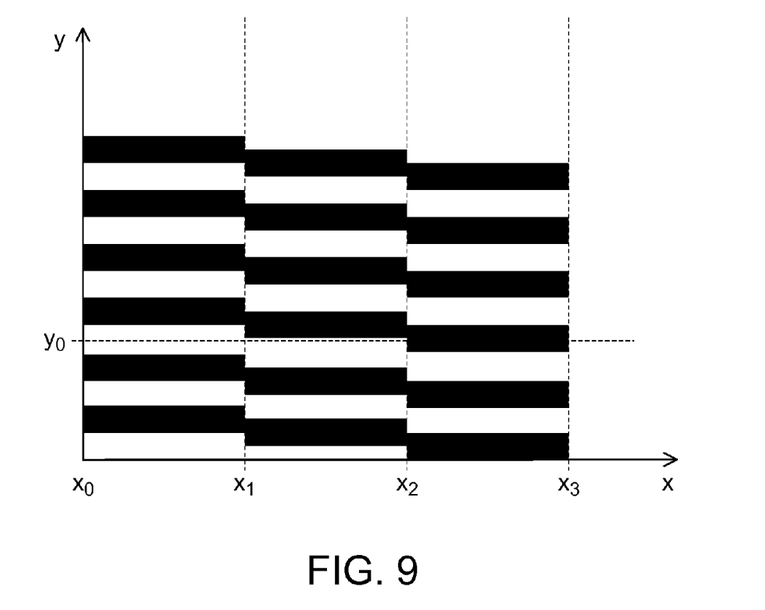
FIG. 9 is a diagram showing a captured image obtained by imaging a fringe pattern projected onto a reference gauge according to this embodiment.

FIG. 9 shows an example of an image obtained by imaging a fringe pattern projected onto the reference gauge 200.

As described above, the imaging unit 12 images a measurement object (reference gauge) from an imaging direction inclined to a plane (xz plane in the above-described example) which is formed in a first direction and a z-axis direction of the fringe pattern. Therefore, as shown in FIG. 9, when phase scanning is performed on pixels along the first direction (x-axis direction) in the captured image, a phase changes depending on the height of the reference surface 203.

Thereafter, the control unit 22 determines whether captured images of a plurality of fringe patterns having different phases are acquired (step S3).

In the case of No occurring in the determination of step S3, the fringe pattern generation unit 221 shifts the phase of the fringe pattern (step S4), and returns to step S1 again to acquire captured images of the fringe patterns having different phases.

Meanwhile, in this embodiment, a phase $\psi n(x, y)$ is calculated on the basis of Expression (2) mentioned above. Therefore, in step S1 to step S3, the fringe pattern generation unit 221 may sequentially generate fringe patterns n having an initial phase $\psi n(x, y)$, a first phase ($\psi n(x, y)+\Delta\theta_1$) which is shifted by $\Delta\theta_1=2\pi/3$ from the initial phase, and a second phase ($\psi n(x, y)+\Delta\theta_2$) which is shifted by $\Delta\theta_2=4\pi/3$ from the initial phase.

In the case of Yes occurring in the determination of step S3, the phase calculation unit 222 calculates the phase $\psi n(x, y)$ on the basis of the plurality of captured images (step S5).

Specifically, the phase calculation unit 222 calculates a phase $\psi n(x, y)$ with respect to each pixel (x, y) from the captured images of the fringe patterns n having a predetermined number (three in this embodiment) of different phases.

At this time, the phase calculation unit 222 scans each pixel $(x, y_i)$ along the first direction, and calculates a phase $\psi n(x, y_i)$ of the pixel $(x, y_i)$ using Expression (2) mentioned above.

Incidentally, the phase calculated on the basis of Expression (2) by the phase calculation unit 222 has an indefinite integral multiple of $2\pi$. Here, the phase calculation unit 222 obtains a real phase (absolute phase) by compensating for an integral multiple of $2\pi$ with respect to the calculated phase when a phase changing direction changes at the time of performing phase scanning along the first direction of the fringe pattern.

Figure 10:
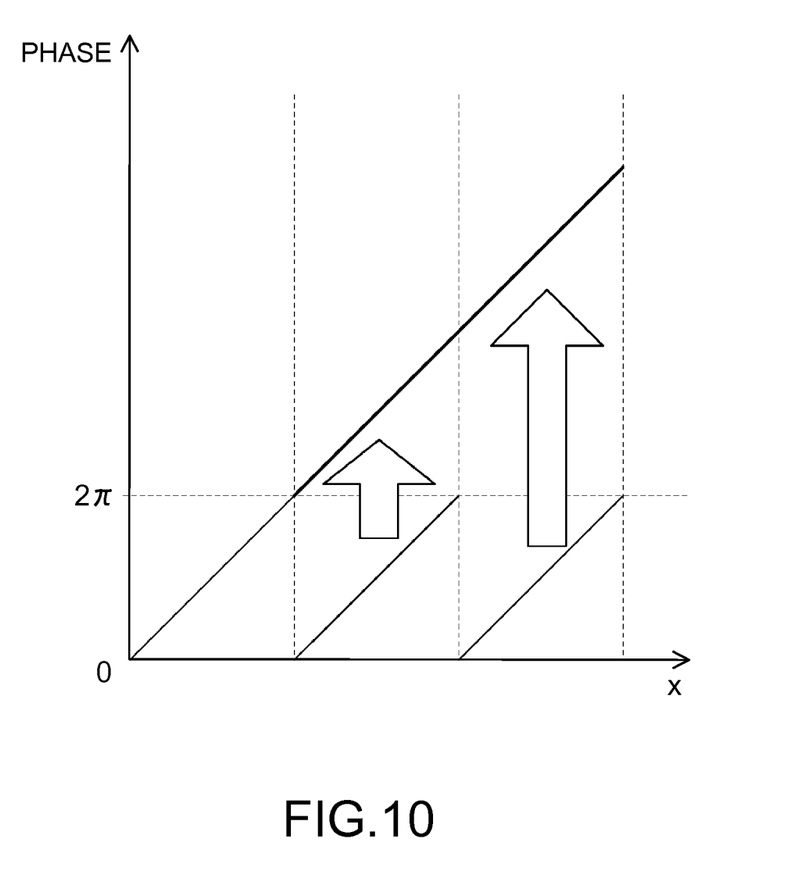
FIG. 10 is a diagram showing a relationship between an absolute phase and a phase which is calculated with respect to an x-axis when phase scanning is performed along a y-axis direction.

FIG. 10 is a diagram showing a relationship between a calculated phase and an absolute phase. For example, a captured image is obtained by projecting a fringe pattern having a first direction as an x-axis direction onto a reference surface which is inclined to a reference plane at a predetermined inclination angle. In this case, when phase scanning is performed in the first direction, a phase changes depending on a height as shown in FIG. 10, and phases of 0 to $2\pi$ are repeatedly shown. Therefore, the phase calculation unit 222 performs phase scanning in the first direction as shown in FIG. 10, and adds $2\pi$ to a calculated phase when the calculated phase changes from $2\pi$ to 0 in a case where the calculated phase monotonically increases. In other words, when a change from $2\pi$ to 0 occurs at the k-th time, 2 k$\pi$ is added to the calculated phase. Thus, it is possible to calculate an absolute phase with respect to a height.

Thereafter, the control unit 22 determines whether phases of fringe patterns for all periods, which are set in advance, have been calculated. That is, in this embodiment, it is assumed that phases for fringe patterns having N different periods are calculated, and it is determined in step S6 whether the relationship of n≥N is satisfied (step S6).

Then, in the case of No occurring in the determination of step S6, the fringe pattern generation unit 221 adds 1 to a configuration variable n (step S7) and returns to step S1.

Phases of fringe patterns having a plurality of different periods are calculated by repeatedly performing the processes of step S1 to step S7.

In the case of No occurring in the determination of step S6, the calibration processing unit 225 generates relational data for $y=y_i$ (i=0, 1, 2 . . . ) shown in FIG. 6 by associating a phase $\psi n(x, y_i)$, calculated with respect to coordinates (x, $y_i$) along the first direction, with the z-coordinate (step S8).

Figure 11:
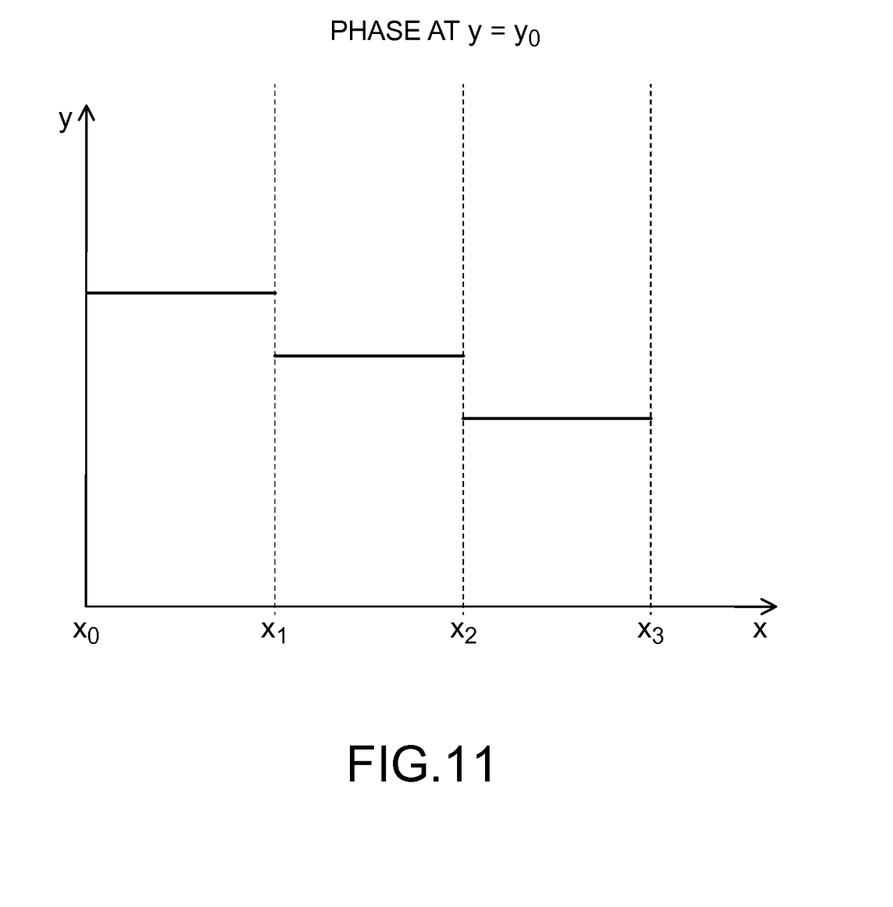
FIG. 11 is a diagram showing calculation results of phases of pixels based on $y=y_0$.

FIG. 11 is a diagram showing calculation results of phases $\psi n(x, y_0)$ of pixels based on $y=y_0$.

For example, as shown in FIG. 11, when the pixels are scanned along a straight line $y=y_0$ which is parallel to the first direction of the fringe pattern, the height changes in a stepped portion of the reference surface 203, and thus the phase also changes in response to the amount of change in the height. In FIG. 11, a straight line portion satisfying the relationships of $x=x_1$ and $x=x_2$ is a stepped portion in which height changes. In addition, regions satisfying the relationship of $x_0<x_A<x_1$ have the same phase along a y-axis direction (first direction) in pixel coordinates corresponding to the stepped surface 202A. Similarly, regions satisfying the relationship of $x_1<x<x_2$ have the same phase along the first direction in pixel coordinates corresponding to the stepped surface 202B, and regions satisfying the relationship of $x_2<x<x_3$ have the same phase along the first direction in pixel coordinates corresponding to the stepped surface 202C. In addition, heights (z-coordinates) of the stepped surfaces 202A, 202B, and 202C are set to the known values $z_A$, $z_B$, and $z_C$, respectively.

In this case, the calibration processing unit 225 generates relational data (see FIG. 6) with respect to $y=y_0$ in which $z=z_A$ is associated with a phase $\psi n(x_A, y_0)$, $z=z_B$ is associated with a phase $\psi n(x_B, y_0)$, and $z=z_C$ is associated with a phase $\psi n(x_C, y_0)$.

In addition, the calibration processing unit 225 similarly generates relational data with respect to other y-coordinates. Further, the calibration processing unit 225 similarly generates relational data with respect to fringe patterns n having other periods.

Shape Measuring Method

Next, a shape measuring method using the shape measuring apparatus 1 according to this embodiment will be described.

Figure 12:
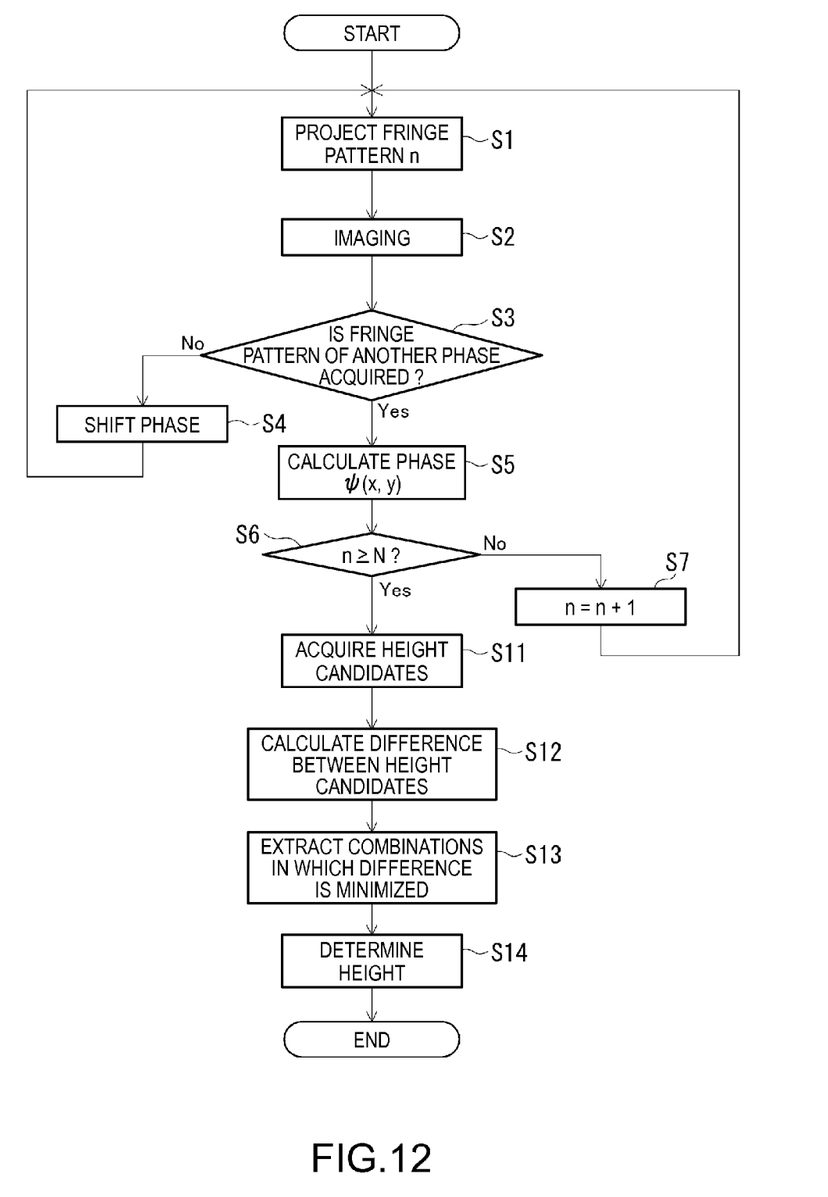
FIG. 12 is a flow chart showing a shape measuring method according to this embodiment.

FIG. 12 is a flow chart showing a shape measurement process according to this embodiment.

In the shape measurement process, first, processes of step S1 to step S7 are performed in a similar manner to the calibration process. In other words, similarly to step S1, a fringe pattern n is projected onto a measurement object mounted on the stage 10 from the pattern projection unit 11, and the fringe pattern n projected onto the measurement object is imaged through step S2. At this time, the fringe pattern generation unit 221 projects patterns having the same direction, phase, and period as those of the fringe pattern n when relational data is generated in the above-described calibration process.

Thereafter, similarly to step S3, the control unit 22 determines whether captured images of a plurality of fringe patterns having different phases have been acquired.

In the case of No occurring in the determination of step S3, the fringe pattern generation unit 221 shifts the phase of the fringe pattern through the process of step S4, and returns to step S1 again to acquire the captured images of the fringe patterns n having different phases.

In the case of Yes occurring in the determination of step S3, the phase calculation unit 222 performs the process of step S5 to calculate a phase with respect to each pixel (x, y)

At this time, the calculated phase has an indefinite integral multiple of $2\pi$, and thus the calculated phase is set to $\psi n(x, y)+2$ k$\pi$.

Thereafter, the control unit 22 performs the process of step S6 to determine whether the phases of the fringe patterns for all the periods have been calculated. In the case of No occurring in the determination of step S6, the fringe pattern generation unit 221 performs the process of step S7 to add 1 to the configuration variable n, and then returns to step S1.

Phases of the fringe patterns having a plurality of different periods are calculated by repeatedly performing the above-described processes of step S1 to step S7.

Then, the candidate acquisition unit 223 acquires height candidates for each pixel (x, y) on the basis of each calculated phase $\psi n(x, y)+2$ k$\pi$ and the relational data stored in the storage unit 21 (step S11).

Here, as described above, each phase $\psi n(x, y)+2$ k$\pi$ has an indefinite integral multiple of $2\pi$, and thus a plurality of height candidates are extracted.

In addition, height candidates for $\psi n(x, y)+2$ k$\pi$ are extracted with respect to fringe patterns having N periods.

Next, the height determination unit 224 calculates a difference between a pair of height candidates which are extracted with respect to the fringe patterns having different periods, among the height candidates extracted in step S11 (step S12).

For example, in a case of N=2 and k=1, a height candidate z11 corresponding to $\psi 1(x, y)$, a height candidate z12 corresponding to $\psi 1(x, y)+2\pi c$, a height candidate z21 corresponding to $\psi 2(x, y)$, and a height candidate z22 corresponding to $\psi 2(x, y)+2\pi$ are extracted with respect to a pixel (x, y). In this case, |z11−z21|, |z11−z22|, |z12−z21|, and |z12−z22| are calculated.

The height determination unit 224 extracts combinations where the difference between the height candidates which is calculated in step S12 is minimized (step S13), and determines a height candidate corresponding to a shorter period among the extracted combinations is determined as a height (z-coordinate) for the pixel (x, y) (step S14).

Operational Effects of this Embodiment

In this embodiment, the reference gauge 200 having the reference surface 203, which has a known height from the bottom surface 201 and has a height changing along a height changing direction, is used in a calibration process. The fringe pattern generation unit 221 irradiates the reference surface 203 of the reference gauge 200 with a fringe pattern in which a first direction is set to be a height changing direction, and shifts the phase thereof multiple times, thereby acquiring captured images for the respective phases. The phase calculation unit 222 calculates phases in the respective pixels along the first direction from the captured images. In addition, the fringe pattern generation unit 221 differentiates periods of fringe patterns to be projected, and the phase calculation unit 222 similarly calculates phases for the respective pixels with respect to the periods. The calibration processing unit 225 generates relational data in which the calculated phases are associated with the height of the reference surface 203 in the reference gauge 200.

In such a calibration method, for example, it is possible to rapidly acquire relational data with a simple configuration without moving the stage 10 having the reference gauge 200 mounted thereon in the z-axis direction.

In addition, the reference surface 203 includes the plurality of stepped surfaces 202 having different heights, which are already known. That is, the stepped surfaces 202 serve as reference points having a height which is known, and the phase calculation unit 222 calculates phases at the reference points.

In such a configuration, the position of a pixel at a reference point can be easily confirmed in a captured image, and thus it is possible to achieve a further increase in the speed of a calibration process.

In this embodiment, the height of the reference surface 203 monotonically increases in the calibration process, and 2 kπ is added to a calculated phase when the phase changes from 2π to 0.

For this reason, it is possible to associate an absolute phase, which is obtained by excluding indefiniteness of 2 kπ, with the height of the reference gauge 200.

In this embodiment, fringe patterns having a plurality of periods are projected onto a measurement object multiple times by shifting the phases of the fringe patterns, and captured images for the respective fringe patterns are acquired. The phase calculation unit 222 calculates phases of pixels with respect to the captured images of the fringe patterns having the respective periods, and the candidate acquisition unit 223 extracts height candidates for the phases on the basis of the calculated phases and relational data. The height determination unit 224 extracts combinations where a difference between the height candidates is minimized, and determines one height candidate having a short period of the fringe pattern as the height (z-coordinate) in the pixel.

Thus, it is possible to easily measure the height of each portion of a measurement object without performing a complex calculation. In addition, a phase shift method using a fringe pattern having a short period is used, and thus it is possible to achieve an improvement in measurement accuracy.

Modification Example

Meanwhile, the invention is not limited to the above-described embodiment, and modifications, improvements, and the like within a scope that can achieve the object of the invention are included in the invention.

Figure 13:
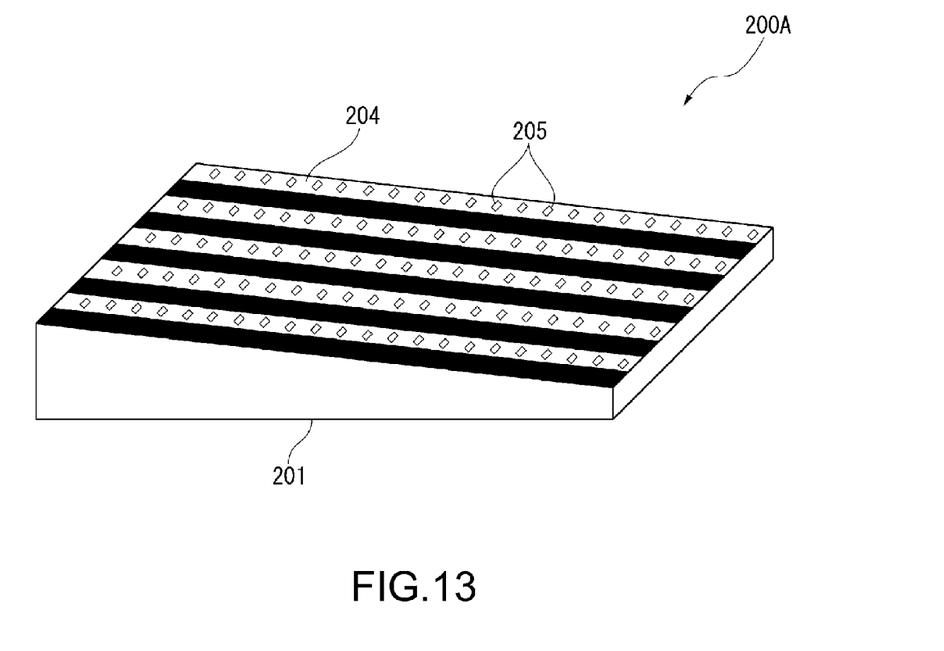
FIG. 13 is a perspective view showing an example of a reference gauge according to another embodiment of the invention.

For example, in the embodiment, an example in which the reference surface 203 has the plurality of stepped surfaces 202 is shown as the reference gauge 200, but the invention is not limited thereto. For example, as shown in FIG. 13, a configuration may be adopted in which a reference surface 204 inclined to the bottom surface 201 at a predetermined inclination angle is provided. Here, in a reference gauge 200A, an inclination angle of the reference surface 204 is already known, and it is possible to easily calculate the height (size in a z-axis direction) from the bottom surface 201 at any location of the reference surface 204.

In addition, as shown in FIG. 13, a configuration may be adopted in which a plurality of markers 205, which are reference points, are provided with respect to the reference surface 204. The markers 205 have a known height from the bottom surface 201 and are provided at a predetermined interval (for example, an interval of 1 mm).

In the above-described embodiment, an example is shown in which a phase is shifted twice and is calculated from three fringe patterns having different phases. However, for example, a phase may be shifted three or more times and may be calculated from a greater number of fringe patterns having different phases.

A configuration may be adopted where a detection sensor detects a height changing direction (stepped direction or inclination direction) in which a z-coordinate changes, is included in the reference surface 203. The fringe pattern generation unit 221 may perform a process of generating a fringe pattern in which the detected height changing direction is set to be a first direction and a process of performing irradiation with the fringe pattern from the pattern projection unit 11.

In this case, it is also preferable that a phase scanning direction based on the phase calculation unit 222 be automatically changed to a direction along the first direction.

In addition, the first direction is not limited to an x-axis direction, and may be, for example, an axial direction which crosses (for example, 45 degrees) and is inclined to an x-axis. The height of the reference surface 203 changes in such a direction, and thus it is possible to perform the calibration process using the same method as that in the above-described embodiment.

In addition, a specific structure at the time of carrying out the invention can be appropriately changed to other structures within a scope capable of accomplishing the object of the invention.

The entire disclosure of Japanese Patent Application No. 2013-238114, filed Nov. 18, 2013 is expressly incorporated by reference herein.

What is claimed is:

1. A calibration method in a shape measuring apparatus, the calibration method comprising:
    acquiring a captured image of a lattice fringe by providing a reference gauge having a reference surface whose height from a reference plane changes in a first direction, projecting a lattice fringe having the same phase in a first direction with respect to the reference surface and having a phase sinusoidally changing in a second direction crossing the first direction, and imaging the lattice fringe;
    calculating a phase of a pixel in the first direction in the captured image of the lattice fringe;
    generating relational data in which a height of the reference surface corresponding to the pixel, a phase calculated with respect to the pixel, and a period of the lattice fringe in which the phase is calculated are associated with each other;
    storing the relational data in a data storage unit of the shape measuring apparatus;
    acquiring a phase of a measurement point obtained from lattice fringes having different phases using a phase acquisition unit of the shape measuring apparatus;
    acquiring height candidates with respect to periods, on the basis of the relational data and the phase acquired by the phase acquisition unit with respect to the lattice fringes whose periods are different from each other using a candidate acquisition unit of the shape measuring apparatus; and obtaining an actual height of the measurement point by extracting the height candidates having a difference minimized therebetween, among the height candidates acquired with respect to the different periods, using a height determination unit of the shape measuring apparatus.

2. The calibration method according to claim 1,
wherein the reference surface includes a reference point for the reference plane, and
wherein the calculating of a phase includes acquiring a phase of the reference point.

3. The calibration method according to claim 1,
wherein the calculating of a phase includes compensating for an integral multiple of $2\pi$ with respect to the acquired phase when the phase with respect to the height of the reference surface is inverted according to a monotonic increase or a monotonic decrease.

4. The method according to claim 1, further comprising:
projecting the lattice fringe onto a measurement object using a pattern projection unit which is also capable of changing a phase and a period of the projected lattice fringe; and
capturing an image of the projected lattice fringe using an imaging unit,
wherein the phase acquisition unit calculates the phase on the basis of the brightness of a pixel corresponding to the measurement point of the image captured by the imaging unit.

5. The shape measuring apparatus according to claim 1,
wherein the height determination unit sets a height candidate, which is acquired with respect to the lattice fringe having a short period, as an actual height of the measurement point among the extracted height candidates.

* * * * *